United States Patent [19]
Lauffer et al.

[11] 3,805,656
[45] Apr. 23, 1974

[54] CIRCULAR METAL COLD SAW
[75] Inventors: Adelbert Lauffer, Reutlingen; Helmut Funder, Pfullingen, both of Germany
[73] Assignee: Gustav Wagner Maschinenfabrik, Reutlingen, Germany
[22] Filed: Oct. 17, 1972
[21] Appl. No.: 298,428

[30] Foreign Application Priority Data
Oct. 27, 1971 Germany.......................... 2153619

[52] U.S. Cl................ 83/508.2, 83/473, 83/477.1, 83/699
[51] Int. Cl.................... B23d 47/00, B26d 7/26
[58] Field of Search .... 83/471.3, 473, 477.1, 486.1, 83/508.2, 699

[56] References Cited
UNITED STATES PATENTS
3,302,669  2/1967  Edler ........................... 83/477.1 X
3,482,610  2/1969  Botefuhr ........................ 83/471.3
3,540,499  11/1970 Sheps ........................... 83/471.3

Primary Examiner—Frank T. Yost
Attorney, Agent, or Firm—W. G. Fasse

[57] ABSTRACT

The present circular metal cold saw has a support adjustably attached to a base by means of half bushings and a round rod extending longitudinally below an overhanging ledge of the base to which the rod is secured. The support is held against the rod at its front end by a first half bushing gripping against the rod from below and at its rear end by a second half bushing pressing against the rod from above. The bushings are preferably secured to the support by adjustable means and the position of the support relative to the base is adjustable by excenter means within relatively small angles of about ± 10 minutes.

7 Claims, 4 Drawing Figures

CIRCULAR METAL COLD SAW

BACKGROUND OF THE INVENTION

The present invention relates to a circular metal cold saw, more specifically saws comprising a base for supporting a saw blade support.

As is known, the saw blade of circular cold saws must be adjusted precisely in parallel to the direction of feed advance of the saw blade support or carriage and also precisely perpendicularly relative to a plane on which the workpiece is supported. In order to satisfy both of thses conditions it was customary heretofore to manufacture as precision parts all elements of the saw which participate in or affect the positioning of the saw blade. Especially, it has been necessary heretofore that the saw blade carriage or support and its guide means satisfy very high requirements with regard to their position and guiding precision. It was possible to satisfy these requirements only by means of very expensive and time consuming manufacturing methods such as precise material removal and finishing steps.

OBJECTS OF THE INVENTION

In view of the foregoing it is the aim of the invention to achieve the following objects singly or in combination:

to provide a circular cold saw for metal with precise guide means for the saw blade carriage or support while simultaneously avoiding high cost work steps for the machining and finishing of the guide means of the saw blade support;

to provide relatively inexpensive means for adjusting the position of the saw blade support relative to its base, whereby the spport shall be tiltable about a longitudinal axis defining a feed advance direction;

to assure that the saw blade will take up a position precisely perpendicular relative to the plane defined by the workpiece support; and to assure that the saw balde may be advanced precisely in the direction of feed advance.

SUMMARY OF THE INVENTION

According to the invention there is provided a cold circular saw for metal in which a saw blade carriage or support is carried by a base. The attachment means for adjustably securing the saw blade support to the base comprise means for adjusting the support relative to the base in such a manner that the support is adjustable in the guide plane and perpendicularly to the longitudinal direction of feed advance as well as in a plane which extends perpendicularly to the guide plane and also perpendicularly to said longitudinal direction of feed advance, whereby the adjustment, movement or tilting will be by relatively small angles of about ± 10 minutes. These small angles result, for example for a length of 1,000 mm in an adjustability of about ± 1 mm. Such small adjustment has the surprising advantage that precision machining of the cooperating parts can be avoided.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
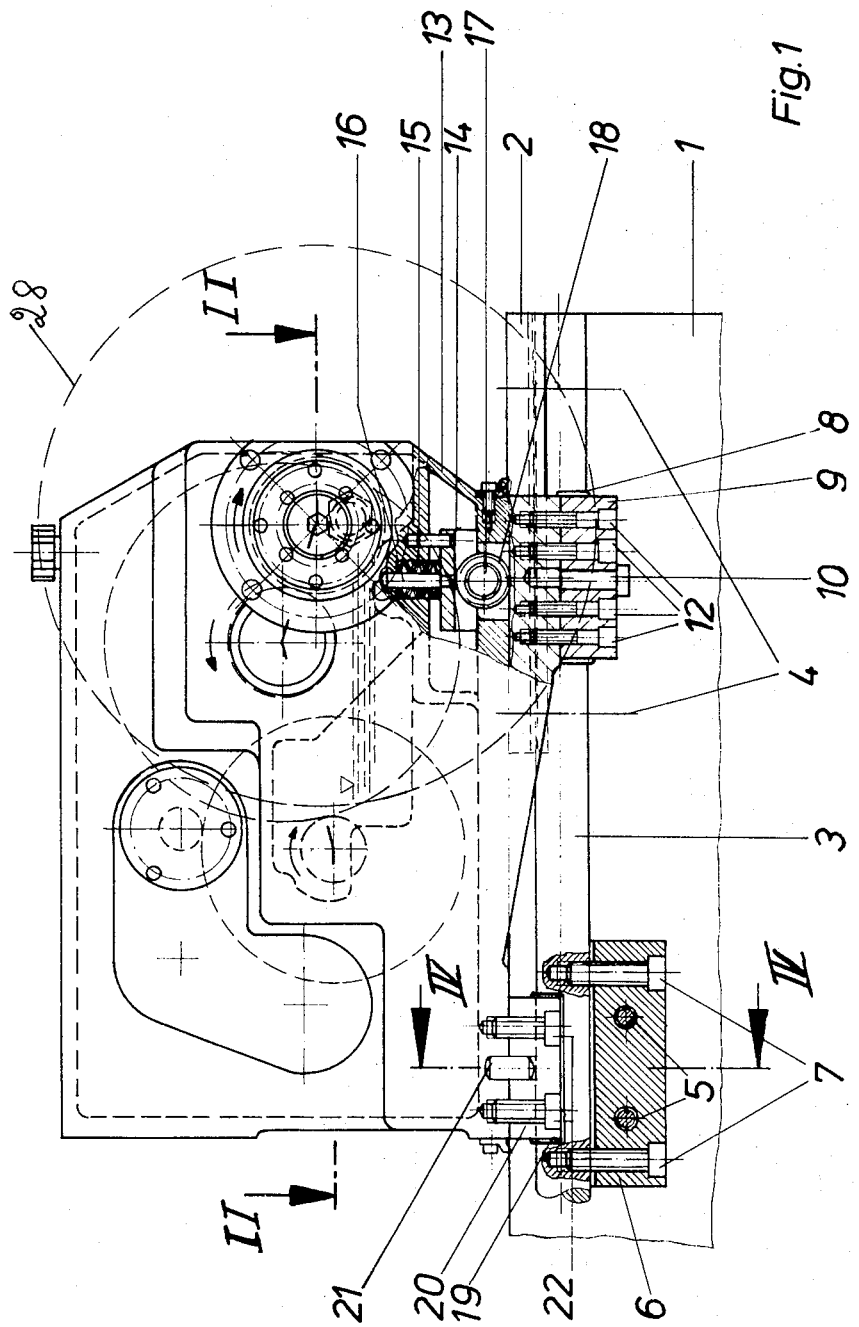
FIG. 1 illustrates a side view of the saw according to the invention showing only part of the base on top of which is arranged a saw blade support, whereby certain portions are shown broken away or in section in order to better reveal the important elements.
Figure 3:
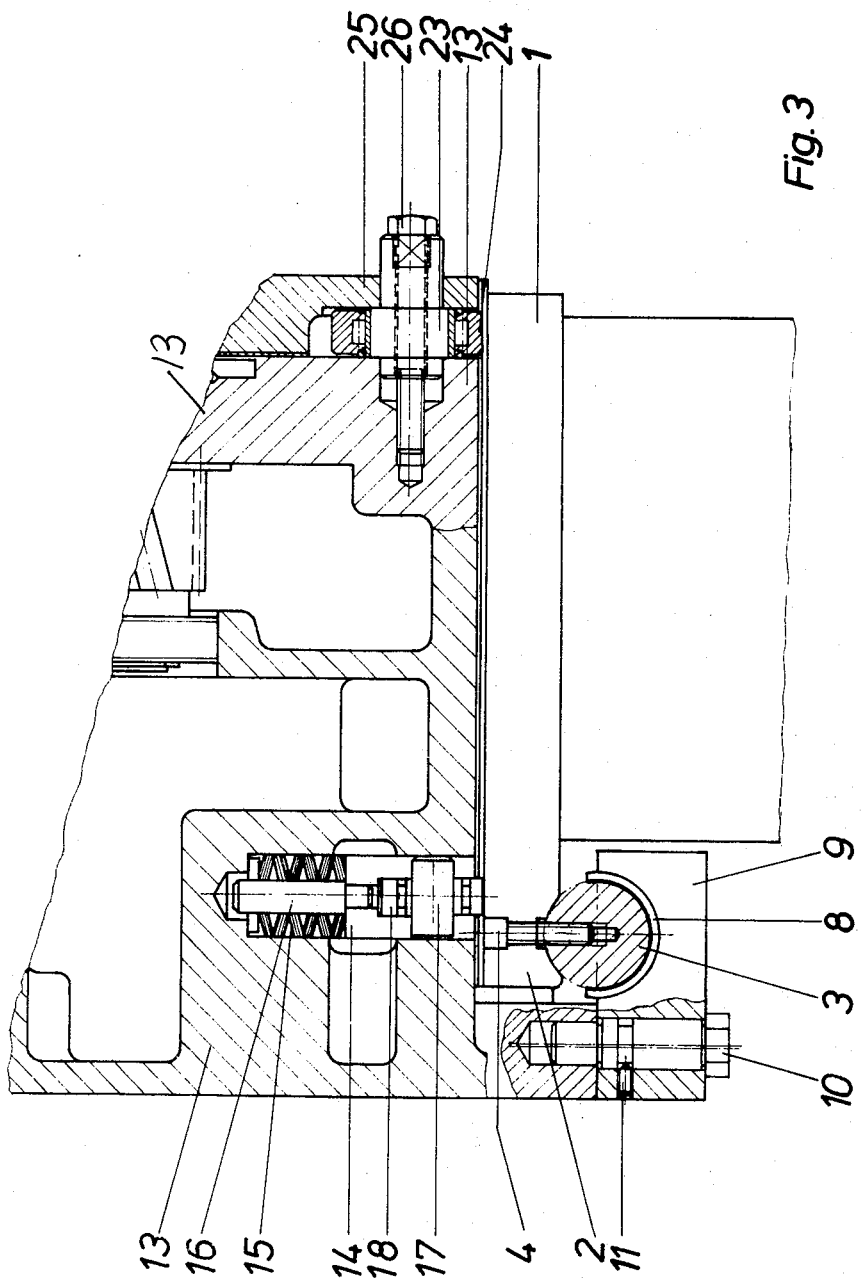
FIG. 3 is a vertical section through the saw blade support along the section line III—III in FIG. 2.
Figure 4:
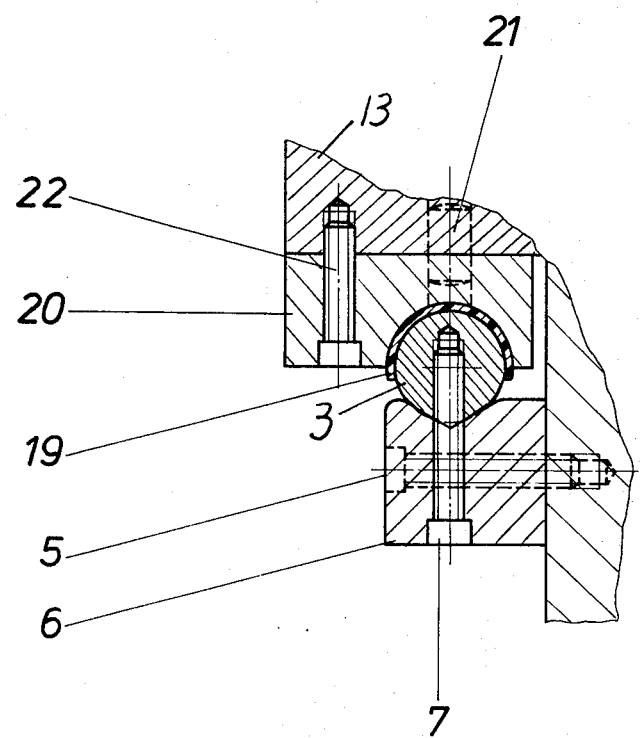
FIG. 4 is a partial sectional view through the connecting means between the saw blade support and the base at the rear end thereof along the section line IV—IV in FIG. 1.

Referring to FIGS. 1 and 3 there is shown a base 1, the top of which is formed as a flat guide plane which in turn forms a laterally extending overhang ledge 2 as best seen at the left side of FIG. 3. To facilitate the description the right hand side of FIG. 1 is considered the front end and the left hand side of FIG. 1 is considered the rear end of the saw described in the example. The laterally extending ledge 2 provides an overhang surface which extends from the front end at least partially toward the rear end of the base and along the side of the machine adjacent to the saw blade 28 shown in phantom lines in FIG. 1. According to the invention a guide rod, preferably a round guide rod 3 is secured at the front end to said overhang surface of the ledge 2 for example by means of screws 4 extending through the ledge 2. The screws 4 are visible in FIG. 3 but are merely indicated by respective lines in FIG. 1. The guide rod 3 which incidentally could be considered to define with its longitudinal axis the longitudinal direction of feed advance, is connected with its rear end to the base 1 by means of a block 6 laterally secured to the base 1 by means of threaded bolts 5 as best seen in FIG. 4. The rear end of the rod 3 rests on the block 6 preferably in a groove and is secured to the block by means of screws 7.

From FIGS. 3 and 4 it will be seen that the saw blade support or carriage 13 engages the guide rod 3 by means of a half bushing 9 at the front end and by means of a further half bushing 20 at the rear end. Thus, the guide rod 3 serves as the hinging axis for the saw blade support 13 when the latter is tilted for adjusting its position relative to the guide plane defined by the top of the ledge 2 as will be described in more detail below. The saw blade support 13 rides on the guide surface of the ledge 2 by means of rollers 18 and 24 as best seen in FIG. 3. The roller 18 is preferably subject to the pressure of resilient means such as cup springs 15 which are held in a bore of the support 13 and which are guided by a guide pin 16 for applying their pressure through a pressure piece 14 to an axle 17 and thus to the roller 18, whereby the support 13 is held about 1 mm above the guide plane of the ledge 2. Preferably, the roller 18 is arranged approximately below the drive shaft of the saw blade 28 as best seen in FIG. 1. The roller 18 is preferably supported on the axle 17 by means of a needle bearing. The axle 17 is guided up and down in the bore of the support 13, whereby the resilient means or cup springs 15 tend to press the saw blade support 13 upwardly to the extent permitted by the front bushing 9 which contacts the guide rod at the front end from below as best seen in FIG. 3.

Since the saw blade 28, as viewed in the illustration of FIG. 1, rotates clockwise, it presses the workpiece onto the workpiece support. As a result, the reaction forces tend to lift the saw blade support 13 off the base 1 at its front end adjacent to the saw blade shaft while simultaneously pressing the rear end of the support 13 downwardly against the base 1. Therefore, the front half bushing 9 is arranged to grip the guide rod 3 from below as best seen in FIG. 3 and the rear half bushing 20 is secured to the support 13 so that it may press against the guide rod 3 from above. In order that the rear bushing 20 may press against the guide rod 3 from above, the ledge 2 extends only partially from the front end toward the rear end.

The front end bushing 9 is secured to an overhanging portion of the support 13 by means of screws 12 (FIG. 1) which extend through enlarged apertures through the bushing 9 to provide sufficient play for a horizontal adjustment of the bushing 9 back and forth in the plane of the drawing of FIG. 3. The just mentioned adjustment of the bushing 9 is accomplished by means of an excenter bolt 10 extending through a hole in the bushing 9 and fitting into a respective opening in the support 13. In order to adjust the position of the bushing 9 relative to the guide rod 3 the screws 12 are loosened, the excenter bolt 10 is rotated until the bushing 9 is in the desired position and then the screws 12 are tightened again. Incidentally, the front half bushing 9 is provided with a lining 8 of plastics material.

The rear half bushing 20 which is provided with a lining 19 of plastics material is rotatably connected to the support 13 by means of a pivot pin 21. Screws 22 extend through enlarged apertures of the bushing 20 and into respective threaded holes in the support 13. The position of the bushing 20 relative to the guide rod 3 may be adjusted by loosening the screws 22 and then slightly rotating the bushing 20 to its desired position whereupon the screws 22 are tightened again, please see FIGS. 1 and 4. The just described possibilities of adjusting the front and rear bushings 9 and 20 makes it possible to precisely align the circular saw blade relative to the feed advance direction.

Figure 2:
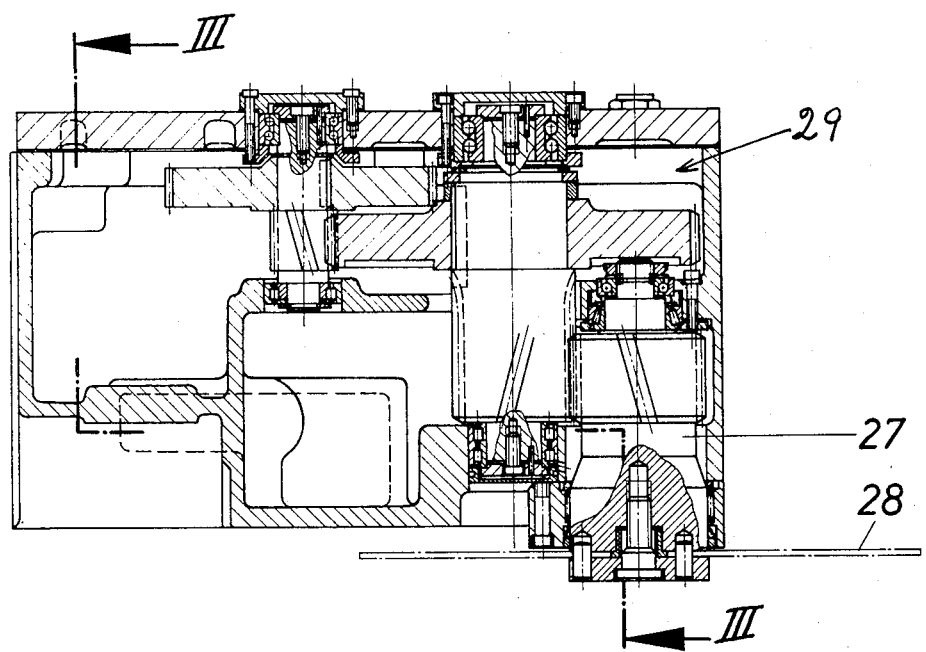
FIG. 2 is a horizontal section through the saw blade support as indicated by the section line II—II in FIG. 1.

Referring briefly to FIG. 2, it will be noted that the saw blade 28 is attached to its drive shaft 27 which is driven through a gear train 29 by a motor not shown.

In addition to the two above described adjustments of the bushings 9 and 20 the invention provides third adjustment means shown at the right hand side of FIG. 3, in order to accomplish the tilting movement of the entire support 13 about the guide rod 3. For this purpose the roller 24 is supported on a portion of an excenter bolt 23 another portion of which extends through a bearing flange 25 as best seen at the right hand side of FIG. 3. The excenter bolt is secured in position by means of a threaded bolt 26 extending longitudinally through the excenter bolt 23 and threaded into a respective hole in the support 13. The adjustment is accomplished by loosening the threaded bolt 26 and then turning the excenter bolt 23 to the desired position whereby the support 13 is raised or lowered or rather slightly tilted about the guide rod 3. When the roller 24 is in the desired position the bolt 26 is tightened again and the roller 24 is pressed downwardly by the reaction forces occurring in the operation of the saw. This arrangement has the advantage that the saw blade support 13 may be precisely adjusted to a position in which the saw blade will extend precisely perpendicularly to the plane of the workpiece support. Incidentally, the just described adjustment means are arranged at the rear end of the saw and opposite to the rear half bushing 20.

Although the invention has been described with reference to specific example embodiments, it is to be understood, that it is intended to cover all modifications and equivalents within the scope of the appended claims.

What is claimed is:

1. A circular metal cold saw, comprising a base having a front end and a rear end, a saw blade support for carrying a saw blade, said base providing a guide plane for said saw blade support and defining a longitudinal guide direction, and means for adjustably connecting said saw blade support to said base whereby the saw blade support is adjustable by a small angle within the range of about ±10 minutes relative to the base in said guide plane and perpendicularly relative to said longitudinal guide direction and in a plane extending perpendicularly to said guide plane and perpendicularly to said guide direction, wherein said base comprises a flat guide ledge extending along one side of said base adjacent to the saw blade from said front end at least partially toward said rear end, said flat guide ledge having an overhang surface, said means for adjustably connecting said saw blade support to said base comprising a round rod, first means for connecting said round rod to said base at said overhang surface of said flat guide ledge adjacent to the front end, second means for connecting said round rod to said base adjacent to said rear end, round half bushings, and means for adjustably attaching said round half bushings to said saw blade support for gripping engagement with said round rod.

2. The circular metal cold saw according to claim 1, wherein said means for adjustably attaching said round half bushings to said support comprise front attachment means and rear attachment means, said front attachment means including a front bushing block, enlarged apertures extending through said front bushing block, threaded bolts extending through said enlarged apertures for securing said front bushing block to said saw blade support so that said front bushing block reaches into gripping engagement with said round rod, and excenter means extending through said front bushing block and into said saw blade support for laterally adjusting said front bushing block relative to said saw blade support when said threaded bolts are loose, said rear attachment means including a rear bushing block, enlarged apertures extending through said rear bushing block, threaded bolts extending through said enlarged apertures and into said saw blade support for securing said rear bushing block to said saw blade support so that said rear bushing block reaches into engagement with said round rod, and a pivot pin secured to said rear bushing block and extending into said saw blade support for rotating said rear bushing block relative to said saw blade support when said threaded bolts through the rear bushing block are loose.

3. The circular metal cold saw according to claim 2, wherein said front bushing block engages said round rod from below, and wherein said rear bushing block bears against said round rod from above.

4. The circular metal cold saw according to claim 2, wherein said half bushings are formed as respective grooves in said front and rear bushing blocks, said grooves having a semicircular cross section, said half bushings comprising each a lining of plastics material.

5. The circular metal cold saw according to claim 2, further comprising a bearing flange secured to said base at the rear end thereof and opposite said rear bushing block, supporting roller means for said saw blade support, an excenter bolt, screw means for securing said excenter bolt to said saw blade support, said excenter bolt having a portion about which said support roller rotates for supporting the support on said guide plane, said excenter bolt having a further portion held in said bearing flange whereby adjustment of the excenter bolt, when said screw means are loose, permits rotating the entire saw blade support about the longitudinal axis of said round rod.

6. The circular metal cold saw according to claim 2, further comprising a bore in said saw blade support extending perpendicularly to said guide plane, roller means supported in said bore, resilient means in said bore, and means in said bore between the resilient means and said roller means for pressing the roller means against said guide plane.

7. The circular metal cold saw according to claim 6, wherein said resilient means comprise a plurality of cup springs held in said bore.

* * * * *